United States Patent [19]

Geier et al.

[11] Patent Number: 4,984,155
[45] Date of Patent: Jan. 8, 1991

[54] ORDER ENTRY SYSTEM HAVING CATALOG ASSISTANCE

[75] Inventors: Raymond R. Geier, Florence; Charles L. Smiley, Burlington; Robert L. Stanger, Ft. Thomas, all of Ky.

[73] Assignee: Square D Company, Palatine, Ill.

[21] Appl. No.: 237,895

[22] Filed: Aug. 29, 1988

[51] Int. Cl.$^5$ .......................................... H04M 11/00
[52] U.S. Cl. ..................................... 364/401; 379/90
[58] Field of Search .................. 364/401, 200, 900; 235/381; 379/90, 99, 95, 67, 92, 97

[56] References Cited

U.S. PATENT DOCUMENTS

| | | | |
|---|---|---|---|
| 4,107,467 | 8/1978 | Johnson et al. | 379/99 |
| 4,300,040 | 11/1981 | Gould | 235/381 |
| 4,383,298 | 5/1983 | Huff et al. | 364/300 |
| 4,396,985 | 8/1983 | Ohara | 364/405 |
| 4,459,663 | 7/1984 | Dye | 364/200 |
| 4,460,965 | 7/1984 | Trehn et al. | 364/464 |
| 4,464,719 | 8/1984 | Spellmann | 364/300 |
| 4,530,067 | 7/1985 | Dorr | 364/900 |
| 4,547,851 | 10/1985 | Kurland | 364/401 |
| 4,569,421 | 2/1986 | Sandstedt | 186/39 |
| 4,591,983 | 5/1986 | Bennett et al. | 364/403 |
| 4,654,482 | 3/1987 | De Angelis | 379/95 |
| 4,734,858 | 3/1988 | Schlafly | 364/408 |

OTHER PUBLICATIONS

Square-D Digest, Square D Company 1988, Cover Page, Quick Index page, pp. 1A, 2A, 55.

Buthon Ware, Inc., PC-File/R user's guide—1985, pp. 22-24.

*Primary Examiner*—Jerry Smith
*Assistant Examiner*—Kim Thanh Tbui
*Attorney, Agent, or Firm*—Arnold, White & Durkee

[57] ABSTRACT

In a system for enabling a customer to operate a data terminal for placing an order for goods or services from a supplier, the data terminal displays information about the goods or services being ordered to complete, correct or update information available from the supplier's catalog. The system has a product file including records having a unique product code for each product, and a catalog number index for indexing the product records. A catalog number supplied by the customer is recognized as invalid when it is not found in the catalog number index. To provide catalog assistance, the customer is permitted to enter an invalid catalog number that is used as a key to random access the product file and display the product code, catalog number and other information such as product availability, product description or product change history for each of a series of products having catalog numbers similar to the catalog number entered by the customer. The customer may then select a desired catalog number or product code on the display for use in the line item of an order without typing in the correct catalog number or product code. In a multiprocessing system, a product file buffer is used for each customer to facilitate paging of the catalog assistance information.

19 Claims, 7 Drawing Sheets

ORDER ENTRY SYSTEM HAVING CATALOG ASSISTANCE

BACKGROUND OF THE INVENTION

1. Technical Field

The present invention relates to a method and system for enabling customers at respective customer locations to operate data terminals for placing orders for goods or services. More specifically, this invention relates to such a method and system in which the customers obtain from their data terminals product information that augments or supersedes the product information that is available from a catalog.

2. Description of Related Art

A method and system for enabling a large number of consumers to place orders for goods and services with a data terminal is disclosed in Schlafly U.S. Pat. No. 4,734,858. In response to visually displayed prompts, the user of the data terminal selects the nature of the goods or services desired. The user chooses the supplier and the particular item, using a product code that is selected either from the supplier's catalog or from special instructions made available for that purpose. The particular data related to the selected item, together with an individual personal authorization code are entered in the terminal keyboard. The user may then review each stored segment of data to confirm or make changes or completely abort the data entry. All of the data related to the user's order, if it is to be executed, is stored in a send memory by a key command. Additional entries of orders can be made and placed in the send memory until it is filled. When the user is ready, the orders placed in the terminal are transmitted after automatic dialing by the terminal through an internal modem to a local or central processing center over a telephone communication link. In one embodiment, merchandise is ordered from a supplier catalog using a particular code for that supplier catalog, page number, and product identification numbers together with quantity and product option codes in the order and manner as these appear on the catalog page. In another embodiment, product identifying bar codes are printed in a catalog alongside the displayed products. When a customer desires a product, a scanning motion with an activated bar code reader causes the entry of data identifying the catalog, the product and such other data deemed desirable for processing an order.

SUMMARY OF THE INVENTION

It has been discovered that the primary problem encountered when customers are permitted to enter their own orders is the difficulty of entering a proper catalog number. In many cases this difficulty arises from incomplete, incorrect or obsolete catalog information in addition to errors by the user when entering the catalog numbers or product codes read from the supplier's catalog.

Accordingly, the present invention provides a method and system in which the data terminal displays to the customer additional information about the goods or services being ordered in order to complete, correct or update the information available from the supplier's catalog. This catalog assistance is provided to the customer upon the customer's request or when the customer identifies an item to be ordered with information from the catalog that is known to be incomplete, incorrect or obsolete in view of a complete and current file of all the products sold or having been offered for sale by the supplier.

In the preferred embodiment, an order entry system includes a catalog number identification aid that uses the number supplied by the customer as a key to access a product file that has been key-indexed by the supplier's catalog numbers. The product file includes a record having a unique product code for each product sold or having been offered for sale by the supplier. As a result of the key access of the product file, the product code, catalog number and other information such as product availability, product description or product change history for each of a series of product records are displayed to the user. The user is given the option of selecting any one of the products to obtain further information about the product or to enter the product as a line item in an order, without any need for the user to enter any further product identification information. The user can also page forward or backward through the product file from the records initially displayed as a result of the key access. In a multiuser or timeshared system, this paging is performed efficiently by providing a product file buffer for each customer that is logged on to the order entry system.

BRIEF DESCRIPTION OF THE DRAWINGS

Other objects and advantages of the invention will become apparent upon reading the following detailed description and upon reference to the drawings in which.

Figure 1:
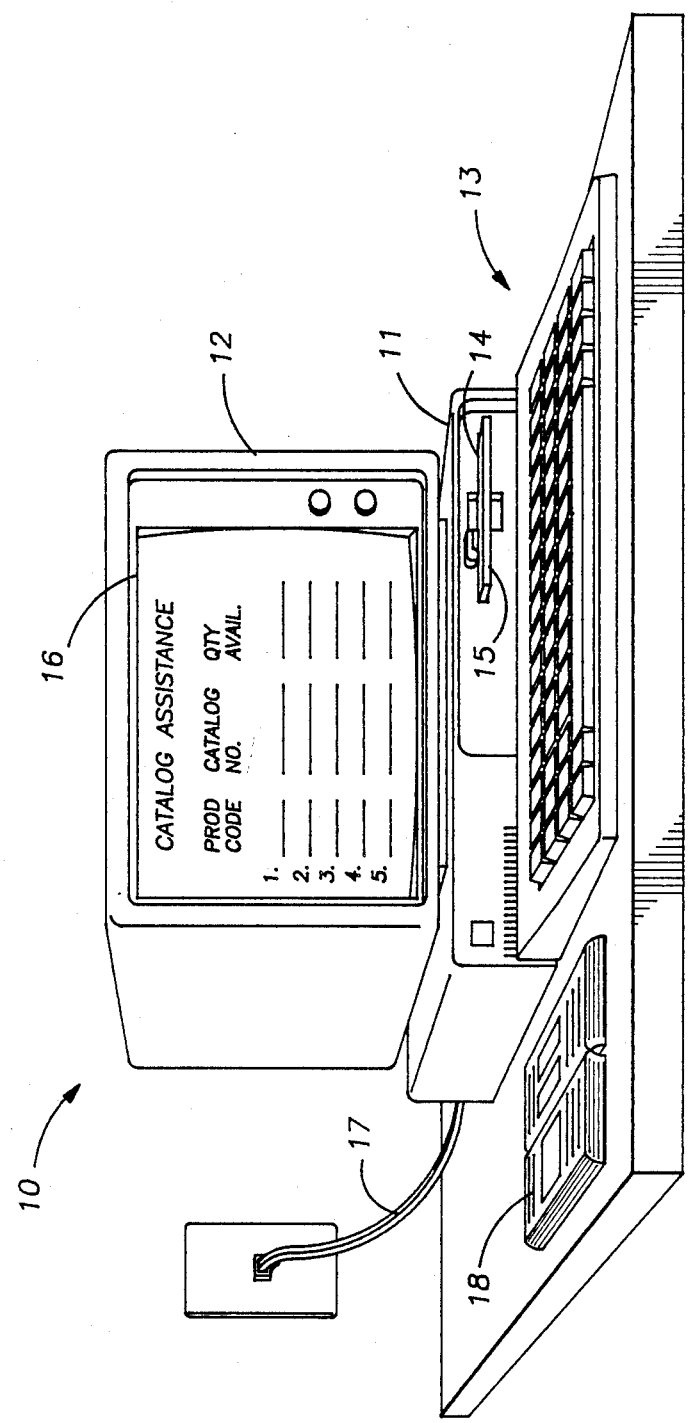
FIG. 1 is a perspective view of an order entry terminal employing the present invention at a customer location.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents and alternatives falling within the spirit and scope of the invention as defined by the appended claims.

DESCRIPTION OF THE PREFERRED EMBODIMENT

Turning now to FIG. 1, there is shown a perspective view of an order entry terminal generally designated 10 at a customer location. It should be apparent that the terminal 10 comprises a conventional personal computer having a processing unit 11, a video display 12, and a keyboard 13. Built into the processing unit 11 is a disk drive 14 receiving a floppy disk 15.

The floppy disk 15 includes a communications program that permits the terminal 10 to operate as remote terminal for a computer system at a supplier location, as further described below in connection with FIG. 2. In particular, the communications program permits the computer system to display alphanumeric characters at selected locations on a screen 16 of the video display 12. Such communications programs are well known; for example, a suitable communications program is sold under the trademark "PROCOMM" by Datastorm Technologies, Inc., P.O. Box 1471, Columbia, Mo. 65205. Preferably the terminal 10 communicates with the remote computer system over a telephone line 17, and the data processing unit 11 has a built in autodial modem (not shown) to facilitate this communication.

As is conventional, the customer consults a supplier's catalog to get an idea of particular products to be ordered. The customer then operates the terminal 10 and keyboard 13 to enter the catalog numbers for the products to be ordered. A problem arises, however, due to the difficultly of entering correct catalog numbers into the terminal 10. In addition to possible error by the customer, this difficulty is caused by the fact that the catalog numbers in the catalog 18 are often incomplete, incorrect or obsolete. In most cases, this is not due to errors in the catalog 18. Instead, the difficulty is due to the fact that the supplier's product mix is rapidly changing due to advances in technology and the desire of the supplier to offer improved products to the customer. This is particularly true of the suppliers of electrical and electronic components.

As shown on the display screen 16, at the customer's option or when an incomplete, incorrect or obsolete catalog number is entered into the terminal 10, the supplier's computer system returns catalog assistance information which helps identify the supplier's products that are most closely associated with the catalog number having been entered. The catalog assistance information, for example, includes a list of product codes which uniquely identify the products sold or having been offered for sale by the supplier, along with respective catalog numbers and the quantities available for each product.

The customer is also given the option of selecting from the catalog assistance information a product code or catalog number displayed on the screen 16 without any need to retype that information. The selected product code or catalog number can then be used to generate a line item in an order for that product or to obtain further information about the product before the customer decides whether to order the product.

As shown in FIG. 1, each product code is prefixed by a sequence number ranging from 1 to 5 and the customer may select the corresponding product code or catalog number by entering its associated sequence number into the keyboard 13. Other methods could be used for selecting a product code or catalog number displayed on the screen, for example, by using an alternative input device such as a light pen, touch screen or mouse (not shown).

Figure 2:
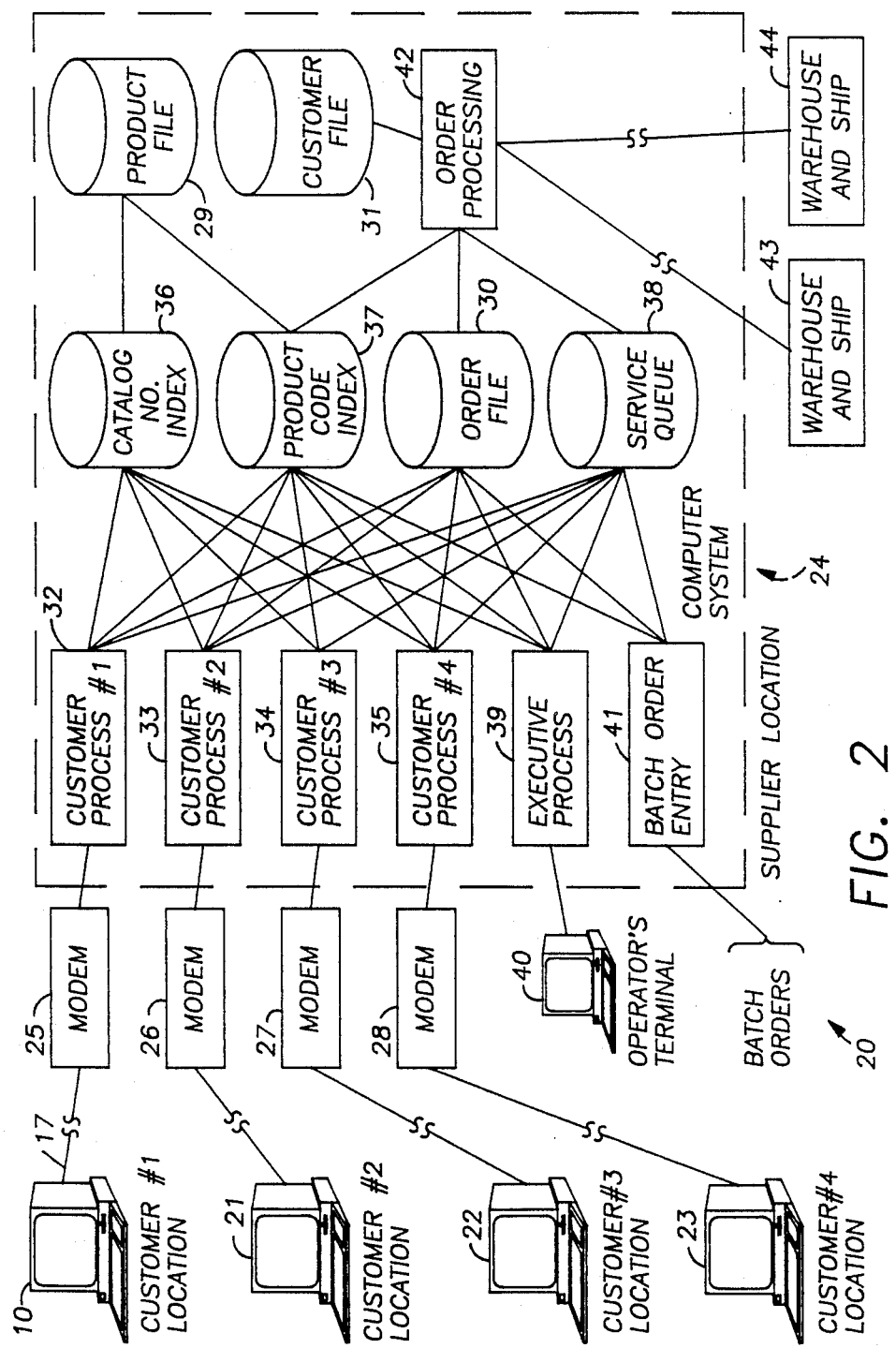
FIG. 2 is a schematic diagram of an order entry system employing the customer terminal of FIG. 1.

Turning now to FIG. 2, there is shown a block diagram of the order entry system generally designated 20 including the customer terminal 10 as well as additional customer terminals 21, 22 and 23 which are connected to the computer system 24 at the supplier location. For enabling each of the customers to access the computer system 24 simultaneously on a multiprocessing or time sharing basis, the computer system is connected to a bank of modems 25, 26, 27, and 28. For entering and processing orders, the computer system 24 includes at least three primary files. These primary files include a product file 29 including information about each product sold or having been offered for sale by the supplier, an order file 30 storing outstanding orders to be filled, and a customer file 31 storing information about customers.

To place an order, the customer operates a respective terminal the customer location to access the computer system via one of the modems. The computer system executes a respective customer process 32, 33, 34 or 35 for the customer so long as the customer is communicating with the system.

As further described below, the customer process enables the customer to access product information in the product file 29 by specifying either a catalog number or a product code. Preferably this is done by organizing the product file as a series of records for each product, and indexing those records by both a catalog number index 36 and a produce code index 37. Such indexes for files are typically created and maintained by conventional memory management facilities for accessing key indexed files. The catalog number, for example, is the primary key for the product file, and the product code is an auxiliary key for the product file. This facilitates obtaining the catalog assistance information when a partial catalog number is supplied by the user. Since the catalog number is used as the primary key, the product file can be randomly accessed by key using the partial catalog number supplied by the user, and then accessed sequentially to obtain records having catalog numbers similar to the partial catalog number supplied by the user. This is further described below in connection with FIG. 5.

Even though the customer may not directly access the product file, the customer process will access the product file to check for the existence of each product ordered by a customer. If a product code cannot be found for a product ordered by the customer, then special authorization is required for the supplier to accept the order. The orders are placed in an order file 30 and any problems that arise with an order are noted in a service queue 38 that is monitored by an executive process 39 and reported at an operator's terminal 40.

In the order entry system 20, the supplier may also enter batch orders into the system by operating a batch order entry process 41. Therefore, all of the orders for the supplier are processed by an integrated system. In such a system, the delivery of ordered items is scheduled by an order processing program 42 that processes outstanding orders in the order file 30, updates the customer files when deliveries are made, and also keeps an inventory of the products in the product file 29. Since the product codes uniquely identify the products being sold by the supplier, the order processing program 42 accesses the product file 29 through the product code index 37. Any problems discovered by the order processing program 42 are reported to the operator's terminal by messages placed in the service queue 38.

The order processing program 42 may also determine the location from which the ordered products are to be shipped to the customer. As shown in FIG. 2, the order processing program 42 selects products from either a warehouse 43 or a warehouse 44. It should be noted, however, that the specific organization of the order processing system as shown in FIG. 2 is not important for practicing the present invention.

Figure 3:
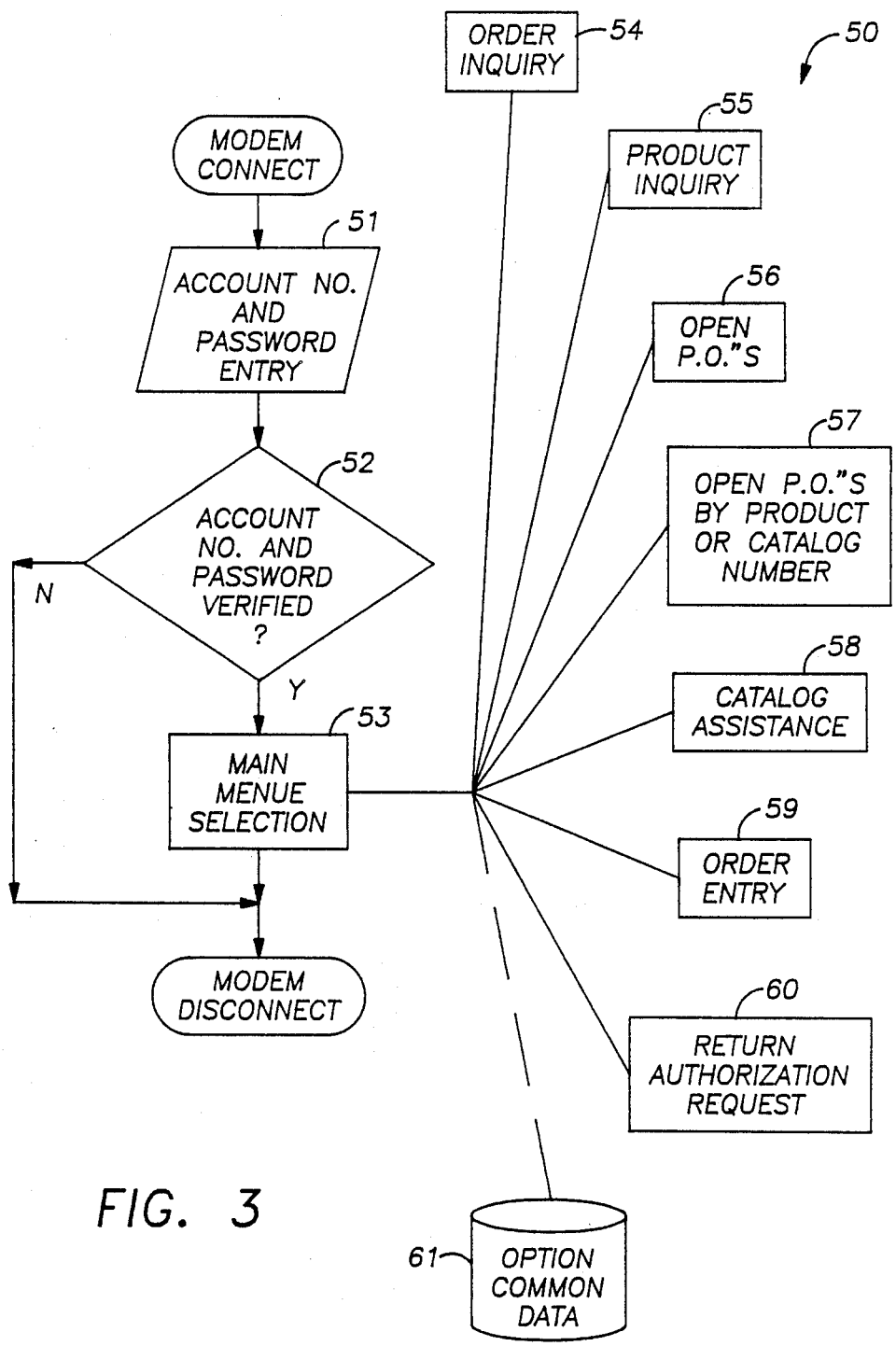
FIG. 3 is a flowchart of the preferred process executed by a computer in the order system of FIG. 2 in order to communicate with a single customer.

Turning now to FIG. 3, there is shown a flowchart generally designated 50 of the preferred customer process using the present invention. After a customer's terminal becomes connected to one of the modems, the customer process must receive an account number and password for the customer. Preferably the account number is automatically transmitted by the communications program for the particular customer, and this is done by sending each customer a unique program disk (15 in FIG. 1).

The customer's account number and password are received in step 51. In step 52, the customer file (31 in FIG. 2) is accessed to verify that the account number and password received from the customer terminal are valid, and if not the customer terminal is disconnected from the modem. Otherwise, in step 53 the customer is given a selection or "main menu" of options. In addition to the option of terminating communication with the computer system, the user may select order inquiry 54, product inquiry 55, open purchase orders 65, open purchase orders by product or catalog number 57, catalog assistance 58, order entry 59, and return authorization request 60.

The main menu selection 53 as well as each of the options 54–60 uses a respective set of display screens to communicate with the customer. A representative set of display screens are shown as Appendices I-XI to the present specification. The particular screens define the format for the data communicated between the customer and the compute system for each of the options.

In the Appendices, the products are electrical components such as switches, circuit breakers, relays, transformers and motor controllers. The product code is numeric, and the catalog number is alphanumeric starting with an alphabetic character. An alphanumeric catalog number, for example, is converted by the computer system 24 to an internal numerical representation, for example, by representing each alphanumeric character by an ASCII code to arrive at a binary number for each alphanumeric catalog number. This conversion process is further described below in connection with FIG. 5.

The screens shown in the Appendices have been designed for user friendly operation in which the user may move between any option by selecting one of eight option numbers that are set out at the bottom of each option screen. The number 8 is selected to return to the main menu screen from an option screen. Information such as a catalog number or product code that is entered or selected in one option ma be passed to another option. This passing of information is performed by storing the information as option common data 61 that is accessible by program modules which display the respective option screens.

The order inquiry option 54 permits the customer to inquire as to the shipping date by item, the shipping location by item, the method of shipment and back order information. For security purposes, each customer is permitted to only inquire as to the orders bearing the customer's own account number.

The product inquiry option 55 permits a customer to access information about the stock availability of a product and its normal net price, its dimensions, weight, and standard package quantities. The extent of the product information such as stock availability given to a particular customer, however, can be restricted depending upon a priority assigned to each customer. The operator of the computer system 24, for example, would have the highest priority and could obtain all knowledge about the availability and warehouse locations of all products sold by the supplier.

The open P.O.'s option 56 enables a customer to identify open orders for a particular item. This option, for example, could be used by a customer when the customer experiences a shortage in his or her inventory for a particular product.

The order entry option 59 enables the customer to "build" an order by entering in any desired customer purchase order number, shipping and routing information, and the product code or catalog number and quantity for each of the products to be ordered.

In some instances a customer may desire to return products back to the supplier. In this case the customer selects the return authorization request option 60.

When the customer is building an order using the order entry option 59, it is necessary for the customer to supply a proper catalog number or product number that uniquely identifies a product being sold by the supplier. Otherwise, the product must be specially manufactured for the particular customer. In many instances, the supplier is selling the product which the customer would like to order but the customer has difficulty in entering a corresponding catalog number. As noted above, this is not necessarily due to any fault of the customer or the supplier, because the supplier is constantly offering improved products and discontinuing obsolete products.

When the customer attempts to order a product by entering a catalog number which the computer system recognizes as incomplete, incorrect, or obsolete, the system displays a message to the customer that the catalog number does not identify "product codeable material" and the customer must either place a special order for the product or the customer should select the catalog assistance option 58 to see if there is any product codeable material that would satisfy his or her needs. If the customer selects the catalog assistance option 58 and finds a suitable product, that product can be marked and its catalog number and product code temporarily stored as option common data until the customer returns to the order entry option. Upon returning to the order entry option 59, the selected catalog number and product code can be automatically inserted as a line item into the order being built by the customer.

Figure 4:
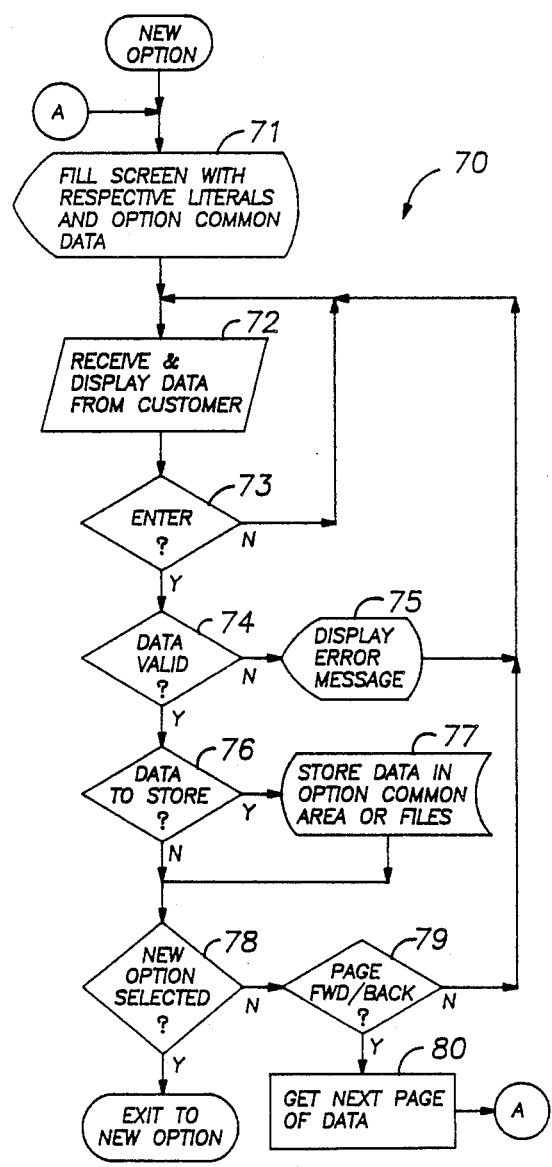
FIG. 4 is a generalized flowchart for the program modules shown in FIG. 3 for displaying respective screens of data to the customer and receiving customer data.

Turning now to FIG. 4, there is shown a flowchart generally designated 70 which illustrates common aspects of each of the options 54–60 introduced in FIG. 3. This commonality makes the various options user friendly because each option interacts with the cusromer in a similar fashion.

In the first step 71 of the flowchart 70, the display screen (16 in FIG. 1) is filled with literals (i.e. alphanumeric constants) and option common data for the respective option. This initial screen is illustrated in Appendix I for the main menu, Appendix II for the order inquiry option, Appendix III for the product inquiry option, Appendix IV for the open P.O.'s option, Appendix V for the open P.O.'s by product option, Appendix VII for the catalog assistance option, Appendix X for the order entry option, and Appendix XI for the return authorization option. Once the initial screen is displayed to the customer, in step 72 the customer may enter data which is displayed back in certain fields of the screen.

When the customer hits the enter key as detected in step 73 the system checks the validity of the data having been entered. If the data is invalid, as detected in step 74, an error message is displayed in step 75 and execution branches back to step 72 to permit the customer to correct the invalid data. If the data is valid, then in step 76 the system may recognize that the data should be stored. If so, then depending in the particular data, in step 77 the data is stored in the option common area for interoption communication or in one of the files such as the order file 38 in the case where the customer has completed an order, the order has been checked, and the customer has released the order to the supplier.

In step 78 the system checks whether the customer has selected a new option. If so, then execution of the program module for the current option terminates and execution is passed to the new option. Otherwise, in step 79 the system may check whether the customer has requested to page forward or backward through a file. This may occur, for example, whenever there are additional pages of data to be displayed to the user, for example, when the user has built up an order that cannot all fit on the display screen at the same time. If the customer has not requested to page forwards or backwards, then execution loops back to step 72. Otherwise, in step 80 a new page of data is obtained and execution continues in step 71 to display this new page of data on the display screen of the customer's terminal.

Figure 5:
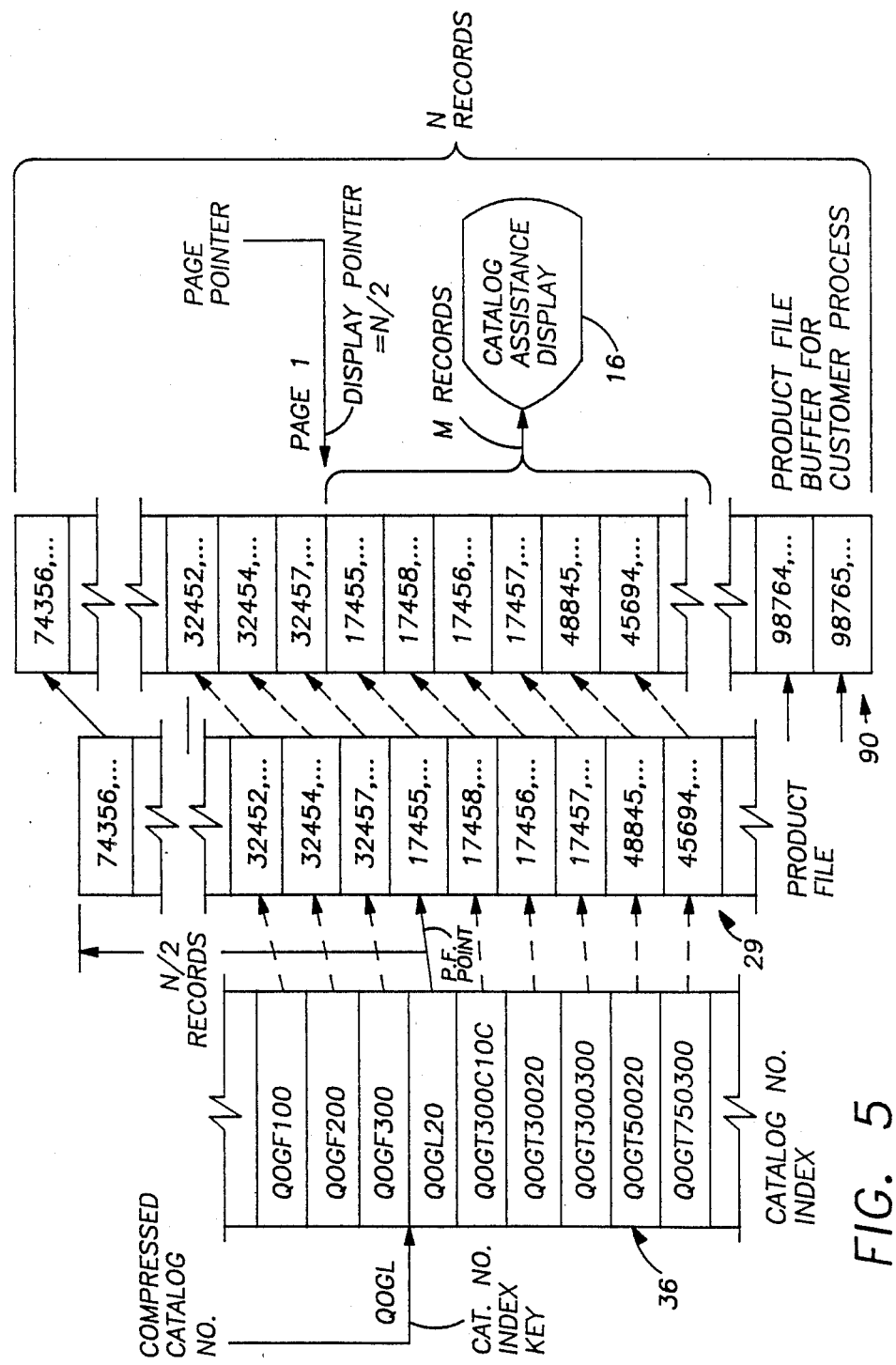
FIG. 5 is a schematic diagram showing a specific method for obtaining catalog assistance information from a product file in response to a catalog number supplied by the customer.

Turning now to FIG. 5, there is shown a schematic diagram illustrating a method that the catalog assistance option may use to display catalog assistance information in response to a catalog number supplied by the customer. The particular catalog numbers and product codes shown in FIG. 5 correspond to the catalog numbers and product codes which appear in the screens shown in Appendix VIII and Appendix IX. In this example, the customer has supplied an incomplete catalog number "QOGL" resulting in the numerical sequence of catalog numbers which follow the customer supplied catalog number.

As illustrated in FIG. 5, the catalog numbers in the catalog number index 36 are compressed by removing blanks and left-justified to obtain a series of alphanumeric characters that are sorted in the same way that words appear in a dictionary. In a similar fashion, the catalog number supplied by the user is compressed and left-justified for use as a key. The catalog number index is searched for this key, resulting in the first catalog number which has an alphanumeric value equal to or greater than the alphanumeric value of the key.

Each catalog number in the catalog number index 36 has a respective pointer in the index that points to a record of the product file 29. The entry in the catalog number index for the first catalog number that is greater or equal to the customer supplied catalog number has a respective pointer pointing to a record in the product file which is used to generate the first line of catalog assistance data that is displayed to the customer. The catalog assistance display further includes a line of information for each of up to a certain number of product file records following this catalog identification number. As shown in FIG. 5, the number of lines of such catalog assistance information is designated by the integer M. For the display shown in Appendix VII, there are thirteen lines of such catalog assistance information and therefore the value of M is 13.

In the computer system 24 of FIG. 2, a single product file 29 is shared among a number of customer processes 32–35. It is desirable to provide a respective product file buffer 90 for each customer process to hold more product information than can be displayed at any one time on the display screen 16. Therefore, each customer process need not access the product file 29 every time that it displays a new page of product information, and the product information is more quickly available for display.

The product file buffer 90 could store product information corresponding to only the catalog numbers having alphanumeric values greater or equal to the alphanumeric value of the catalog number supplied by the customer, or alternatively it could store product information corresponding to catalog numbers having alphanumeric values both greater or less than the alphanumeric value of the catalog number supplied by the customer. The first case is easier to implement because it involves a random key-access of the product file using the customer specified catalog number as a key, and then a sequential access of the product file to transfer additional product file records to the product file buffer. This first case is adequate for completing an incomplete catalog number.

If it is desirable for the customer to browse through the product file to view catalog numbers appearing both before and after the customer specified catalog number, the second case is more desirable. The second case is somewhat more difficult to implement because it involves a random or key access of the product file, and then backing up a certain number of records in the product file before sequentially reading the product file to fill the product file buffer. As shown in FIG. 5, for example, the product file buffer holds N records and the record corresponding to the catalog number that is just greater or equal to the catalog number supplied by the customer appears in record N/2 of the product file buffer. In this case the product file pointer is obtained by backing up through the product file by N/2 product file records.

Figure 6A:
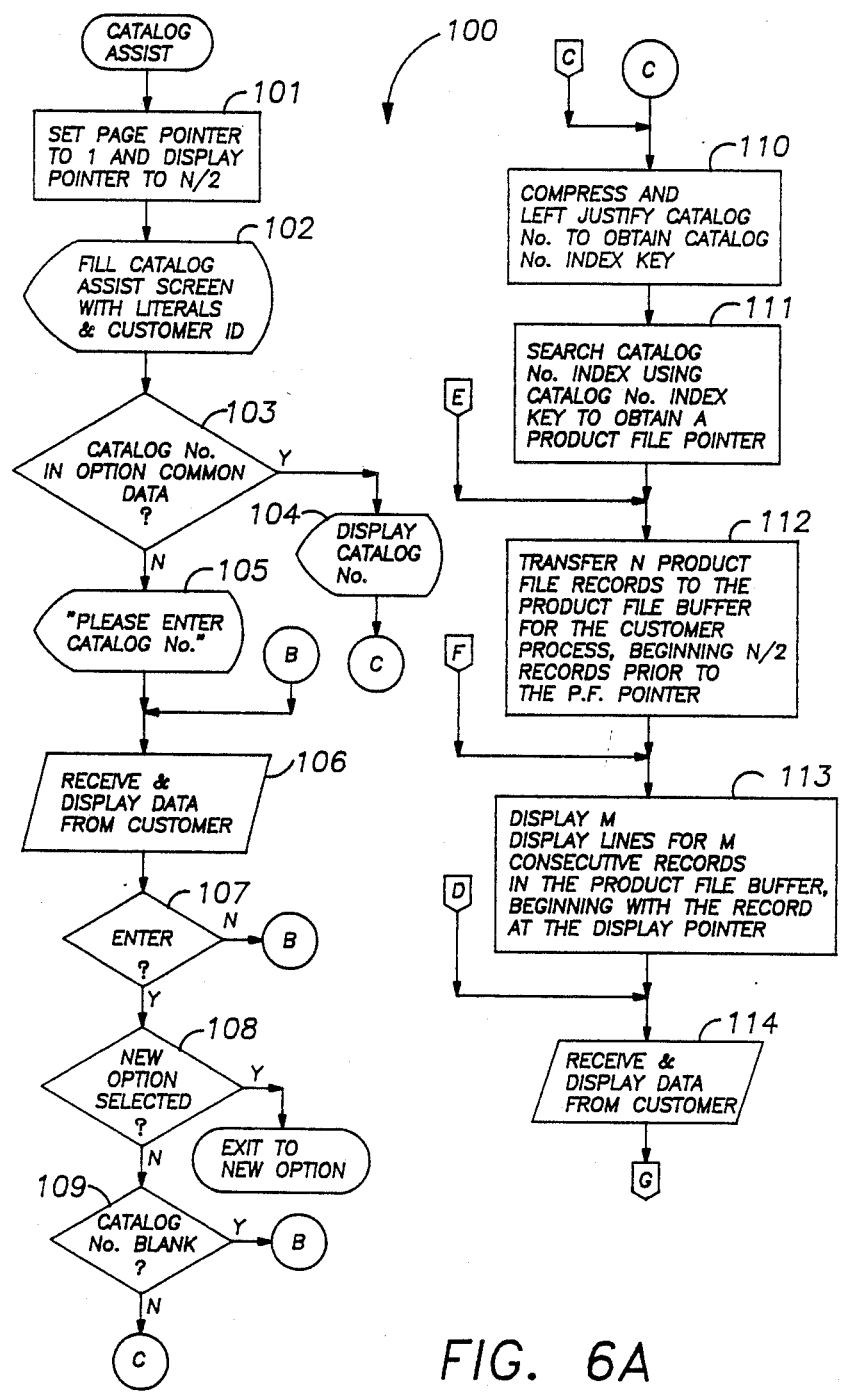
FIGS. 6A and 6B comprise a flowchart of the program module in FIG. 3 which is executed by the computer in the order entry system for displaying the catalog assistance information to the customer.
Figure 6B:
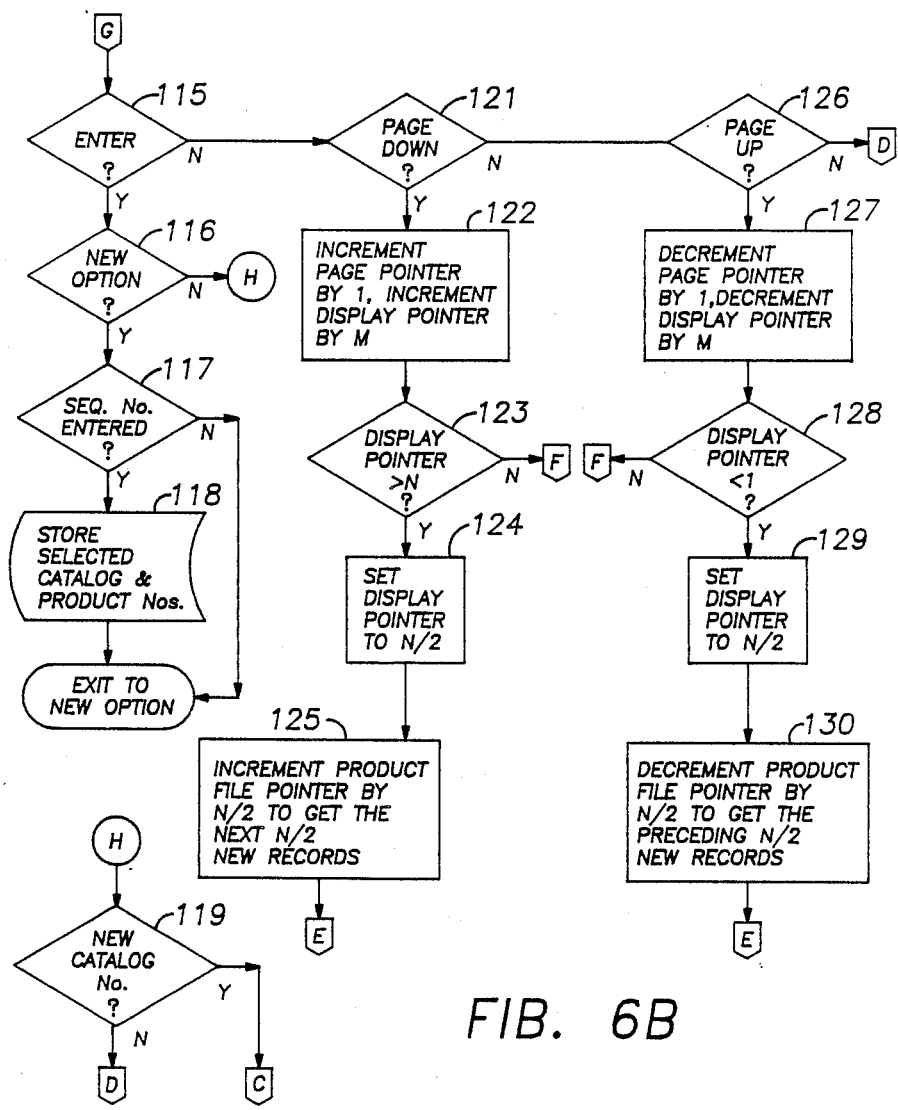

Turning now to FIG. 6A and 6B, there is shown a flowchart generally designated 100 for a catalog assistance program that implements the catalog assistance option in the manner illustrated by FIG. 5. In the first step 101 a page pointer is set to one and a display pointer is set to N/2. The page pointer indicates a page number as shown in Appendix VIII or Appendix X, and the display pointer points to a particular record in the product file buffer. Next in step 102 the catalog assistance screen is displayed including literals and the customer account number. This is illustrated in Appendix VII. Then in step 103, the computer system checks whether a catalog number has just been placed in the option common data area. This will be the case, for example, if an order entry or product inquiry or main menu process was executed in which the customer just entered an invalid catalog number. (The system decides that the catalog number is invalid when it does not appear in the catalog number index.)

If there is a catalog number in the option common data area, then in step 104 that catalog number is displayed on the display screen. Otherwise, in step 105 the message "please enter a catalog number" is displayed at the bottom of the display screen. Then in step 106 data from the customer is received and displayed in the areas indicated by the underlines in Appendix VII, until the customer hits the enter key. When this is detected in step 107, the computer system checks in step 108 to determine whether the customer has selected a new option. If so, the catalog assistance option is terminated and execution of the program module for the new option begins. Otherwise, in step 109 the system checks whether the catalog number supplied by the customer is blank. If so, execution jumps back to step 106 to receive a catalog number from the customer.

Once the catalog number is received, in step 110 the catalog number is compressed by eliminating blanks and left-justified to obtain the catalog number index key. In step 111 the catalog number index is searched using the catalog number index key to obtain a product file pointer. For the method illustrated in FIG. 5, this is done by searching the catalog number index to find the first catalog number that has a value greater or equal to the catalog number index key. Then, using the product file pointer just obtained, the product file is read sequentially starting from N/2 records before the record indicated by the product file pointer to transfer N product file records to the product file buffer for the customer process. Next, in step 113, M display lines are displayed for M consecutive records in the product file buffer, beginning with the record indicated by the display pointer. Therefore, the first time that step 113 is executed for the catalog assistance option; the first line displayed will have the catalog number that was the first catalog number found in the catalog number index having a value greater or equal to the catalog number supplied by the customer.

In step 114 data is received from the customer and displayed. This data could be a new catalog number, a "page down" or "page up" command, a sequence number, or a new option selection. When the customer hits the "enter" key, as tested in step 115 of FIG. 6B, the entry of data is finished. Therefore, in step 116 the computer system first checks whether the user has selected a new option. If a new option is selected, in step 117 the computer checks whether the customer has entered a sequence number. If not, execution of the catalog assistance option is terminated and execution of the new option begins. Otherwise, in step 118 the selected catalog number and product code are stored in the option common area before execution of the catalog assistance option is terminated and execution of the new option begins.

If a new option was not selected in step 116, then in step 119 the computer checks whether a new catalog number was entered. If a new catalog number was entered, then execution branches back to step 110 in FIG. 6A to compress the new catalog number and search using the compressed catalog number. If a new catalog was not entered, then execution branches back to step 114 in FIG. 6A to receive new data from the customer.

If in step 115 the enter key was not hit, then in step 121 the system checks whether the customer has hit a "page down" key. If so, then in step 122 the page pointer is incremented by 1, and the display pointer is incremented by M. In step 123 the display pointer is compared to its maximum value of N and if the maximum value is exceeded execution jumps back to step 113 to display the next M display lines in the product file buffer for the customer process. Otherwise, in step 124 the display pointer is reset to N/2 and in step 125 the product file pointer is incremented by N/2 to get the next N/2 new records from the product file. Execution then continues in step 112 of FIG. 6A to transfer the product file records to the product file buffer for the customer process.

If in step 121 the customer did not hit the "page down" key, the computer checks in step 126 to determine whether the customer has hit the "page up" key. If not, then execution jumps back to step 114 in FIG. 6A to receive new data from the customer. Otherwise, in step 127 the page pointer in decremented by one, and the display pointer is decremented by M. Then in step 128 the display pointer is compared to its minimum value of one.

If the display pointer is not less than its minimum value, execution jumps back to step 113 of FIG. 6A to display the next M display lines for M consecutive records in the product file buffer, beginning with the record at the display pointer. Otherwise, in step 129 the display pointer is reset to N/2 and in step 130 the product file pointer is decremented by N/2 to get the preceding N/2 new records from the product file. Execution then jumps back to step 112 of FIG. 6A to transfer the product file records to the product file buffer for the customer process, beginning with the record having the new product file pointer. Therefore, by using the page up and page down keys, the customer can page through the product file. This is done by paging through the product file buffer for the customer process until the limits of the buffer are reached. When the limits of the buffer are reached, the product file buffer is filled with a new records from the product file to continue the paging process.

| INDEX OF APPENDICIES | |
| --- | --- |
| APPENDIX I. | Main Menu Screen |
| APPENDIX II. | Order Inquiry Screen |
| APPENDIX III. | Product Inquiry Screen |
| APPENDIX IV. | Open PO"s Screen |
| APPENDIX V. | Open PO"s By Produce Screen |
| APPENDIX VI. | Back-Orders By Product Screen |
| APPENDIX VII. | Catalog No. Identification Aid Screen |
| APPENDIX VIII. | Catalog No. Identification Aid Page 1 Screen |
| APPENDIX IX. | Catalog No. Identification Aid Page 2 Screen |
| APPENDIX X. | Order Entry Screen |
| APPENDIX XI. | Return Authorization Screen |

APPENDIX I

WELCOME TO THE SQUARE D ORDER ENTRY SYSTEM
COPYRIGHT © 1988 SQUARE D COMPANY

YOUR ACCOUNT NUMBER 9007_____    FOR ASSISTANCE CALL
                                      (606) 525-XXXX

SELECT ONE OF THE FOLLOWING OPTIONS:____

1. ORDER INQUIRY         ENTER P.O. NUMBER _____
   OR SQUARE D ORDER NUMBER _____  ____
2. PRODUCT INQUIRY       ENTER SQUARE D PRODUCT CODE _____
   OR CATALOG NUM _____
3. OPEN P.O."S

APPENDIX I-continued

4. OPEN P.O."S BY PRODUCT    ENTER SQUARE D PRODUCT CODE _____
   OR CATALOG NUM _____
5. CATALOG NUMBER IDENTIFICATION AID
6. ORDER ENTRY
7. RETURN AUTHORIZATION REQUEST
8. END SESSION
   * DEPRESS ENTER TO CONTINUE *

---------- THE SQUARE D COMPANY ----------
   DEDICATED TO GROWTH * COMMITTED TO QUALITY

SELECT AN OPTION!

APPENDIX II

SQUARE D ORDER INQUIRY
COPYRIGHT © 1988 SQUARE D COMPANY

P.O. NUMBER _____                    SQUARE D ORDER NUMBER _____ _____
ACCOUNT NUMBER  9007                 ITEM _____   BILL/LADING: _____
SHIPPING                                          ORDER DATE _____
ADDRESS.    _____                                 COMPLETE SHIPMENT _____
            _____                                 NOT B/4 DATE _____
       CITY _____ ST _____ ZIP _____

MARKING 1. _____                          2. _____

| ITEM | ORD QTY   | SHPD QTY  | SHPD FROM | REL QTY  | B/O QTY  |
|      | CANC QTY  | SHPD DATE | ROUTING   | REL DATE | B/O PROM |

CATALOG NBR:

CATALOG NBR:

SELECT SCREEN OPTION:                                           MORE ITEMS
1=ORD INQ 2=PROD INQ 3=OPEN PO 4=PO/PROD 5=CAT ID 6=ORD ENT 7=RET 8=END
PLEASE ENTER P.O. NUMBER OR SQUARE D ORDER NUMBER!

APPENDIX III.

SQUARE D PRODUCT INQUIRY
COPYRIGHT © 1988 SQUARE D COMPANY
CATALOG NUMBER _____  PROD CODE _____
ACCOUNT NUMBER   9007

|                 | AVAIL-    |         |         |
| SERVICE CENTER  | ABLE FOR  | DATE    |         |
| SHPMT LOCATION  | SHPMT     | QTY DUE | QTY DUE |
| LENGTH          | WIDTH     | HEIGHT  | WEIGHT  |
| PKG QTY         |           |         |         |

APPENDIX III.-continued

SQUARE D PRODUCT INQUIRY
COPYRIGHT © 1988 SQUARE D COMPANY
CATALOG NUMBER _____  PROD CODE _____
ACCOUNT NUMBER   9007

SELECT SCREEN OPTION: _ TO PASS PRODUCT (ENTER "Y"): N
1=ORD ING 2=PROD INQ 3=OPEN PO 4=PO/PROD
5=CAT ID 6=ORD ENT 7=RET 8=END
PLEASE ENTER CATALOG NUMBER OR PRODUCT CODE.

APPENDIX IV.

SQUARE D OPEN P.O."S
COPYRIGHT (C) 1988 SQUARE D COMPANY

PO NUMBER _____                SQUARE D ORDER NUMBER _____
ACCOUNT NUMBER 9007
                SORTED / BY      SQUARE D
        SEQ#    PO NUMBER        ORDER NUMBER    ORDER DATE

| SEQ# | PO NUMBER | SQUARE D ORDER NUMBER | ORDER DATE |
|------|-----------|-----------------------|------------|
| 1    | FLD 5923  | 0465177 01            | 07/14/88   |
| 2    | JY5 0727  | 0458625 01            | 07/15/88   |
| 3    | NECB608   | 0457481 02            | 07/17/88   |
| 4    | NERX608   | 0438881 03            | 07/18/88   |
| 5    | R0702     | 0412159 03            | 07/19/88   |
| 6    | R0705     | 0426348 02            | 07/19/88   |
| 7    | R0724     | 0472450 01            | 07/24/88   |
| 8    | R0736     | 0442592 02            | 07/25/88   |
| 9    | R0738     | 0445590 03            | 07/26/88   |
| 10   | R0743     | 0442690 04            | 07/26/88   |
| 11   | R0872     | 0432540 05            | 07/26/88   |
| 12   | R0965     | 0458562 01            | 07/26/88   |
| 13   | SRB 577   | 0373031 01            | 06/26/88   |

DEPRESS ENTER TO CONTINUE                           SORTED PURCHASE #: P
SELECT SCREEN OPTION: _ SELECT SEQ# (OPTIONAL): _   CHOOSE SORT (P/S): _

APPENDIX IV.-continued

SQUARE D OPEN P.O."S
COPYRIGHT (C) 1988 SQUARE D COMPANY

PO NUMBER _____ SQUARE D ORDER NUMBER _____

ACCOUNT NUMBER 9007

| SEQ# | SORTED / BY PO NUMBER | SQUARE D ORDER NUMBER | ORDER DATE |
|---|---|---|---|

1=ORD INQ 2=PROD INQ 3=OPEN PO 4=PO/PROD 5=CAT ID  6=ORD ENT 7=RET 8=END
JUST HIT ENTER TO VIEW NEXT ORDER: TEST-DOE-RLS-B  / 0465026 01

APPENDIX V.

SQUARE D OPEN PO"S BY PRODUCT
COPYRIGHT © 1988 SQUARE D COMPANY

CATALOG NUMBER _____ PROD CODE _____

ACCOUNT NUMBER 9007

| SEQ# | SORTED / BY P.O. NUMBER | SQUARE D ORDER NUMBER | ITEM | ORDER DATE |
|---|---|---|---|---|

DEPRESS ENTER TO CONTINUE  SORTED PURCHASE #: P
SELECT SCREEN OPTION: _ SELECT SEQ# (OPTIONAL): _  CHOOSE SORT (P/S): _
1=ORD INQ 2=PROD INQ 3=OPEN PO 4=PO/PROD 5=CAT ID  6=ORD ENT 7=RET 8=END
PLEASE ENTER CATAlOG NUMBER OR PRODUCT CODE.

APPENDIX VI.

SQUARE D BACK-ORDERS BY PRODUCT
COPYRIGHT © 1988 SQUARE D COMPANY

CATALOG NUMBER QOGL 20  GRD LUG _____  PROD CODE 17455

ACCOUNT NUMBER 9007

| SEQ# | SORTED / BY P.O. NUMBER | SQUARE D ORDER NUMBER | ITEM | ORDER DATE |
|---|---|---|---|---|

DEPRESS ENTER TO CONTINUE  SORTED PURCHASE #: P
SELECT SCREEN OPTION: _ SELECT SEQ# (OPTIONAL): _  CHOOSE SORT (P/S): _
1=ORD INQ 2=PROD INQ 3=OPEN PO 4=PO/PROD 5=CAT ID  6=ORD ENT 7=RET 8=END
SORRY:NO BACK ORDERS FOUND TO VIEW.  HIT ENTER FOR OPEN ORDERS.

APPENDIX VII.

SQUARE D CATALOG NUMBER IDENTIFICATION AID
COPYRIGHT © 1988 SQUARE D COMPANY

CATALOG NUMBER _____

ACCOUNT NUMBER 9007

| SEQ# | PROD CODE | CATALOG NUMBER | RATING | QTY AVAIL |
|---|---|---|---|---|

DEPRESS ENTER TO CONTINUE
SELECT SCREEN OPTION: _ SELECT SEQ# (OPTIONAL): _
1=ORD INQ 2=PROD INQ 3=OPEN PO 4=PO/PROD 5=CAT ID 6=ORD ENT 7=RET 8=END
PLEASE ENTER A CATALOG NUMBER

APPENDIX VIII.

SQUARE D CATALOG NUMBER IDENTIFICATION AID
COPYRIGHT © 1988 SQUARE D COMPANY

CATALOG NUMBER _____

ACCOUNT NUMBER 9007

| SEQ# | PROD CODE | CATALOG NUMBER | RATING | QTY AVAIL |
|---|---|---|---|---|
| 1 | 17455 | QOGL 20 | | 108 |
| 2 | 17458 | QOGT 300C 10C | | 104 |
| 3 | 17456 | QOGT 300 20 | | 542 |
| 4 | 17457 | QOGT 300 300 | | 83 |
| 5 | 48845 | QOGT 500 20 | | 64 |
| 6 | 45694 | QOGT 750 300 | | 105 |
| 7 | 76347 | QOHPL | | (NONE) |
| 8 | 05487 | QOH 2100 | | 168 |
| 9 | 05488 | QOH 2125 | | 23 |
| 10 | 05489 | QOH 270 | | 34 |
| 11 | 05490 | QOH 280 | | 12 |
| 12 | 05491 | QOH 290 | | 61 |
| 13 | 74796 | QOL 125 | | 336 |

DEPRESS ENTER TO CONTINUE
SELECT SCREEN OPTION: _ SELECT SEQ# (OPTIONAL): _
1=ORD INQ 2=PROD INQ 3=OPEN PO 4=PO/PROD 5=CAT ID 6=ORD ENT 7=RET 8=END

APPENDIX VIII.-continued

SQUARE D CATALOG NUMBER IDENTIFICATION AID
COPYRIGHT © 1988 SQUARE D COMPANY

CATALOG NUMBER _____

ACCOUNT NUMBER 9007

| SEQ# | PROD CODE | CATALOG NUMBER | RATING | QTY AVAIL |
|---|---|---|---|---|

PLEASE HIT ENTER TO VIEW NEXT CATALOG NUMBER - QOL225

APPENDIX IX.

SQUARE D CATALOG NUMBER IDENTIFICATION AID
COPYRIGHT © 1988 SQUARE D COMPANY

CATALOG NUMBER _____

ACCOUNT NUMBER 9007

| SEQ# | PROD CODE | CATALOG NUMBER | RATING | QTY AVAIL |
|---|---|---|---|---|
| 1 | 74797 | QOL 225 | | 176 |
| 2 | 02981 | QOMB 1 | | 1778 |
| 3 | 02982 | QOMB 2 | | 785 |
| 4 | 02983 | QOMB 3 | | 47 |
| 5 | 74794 | QOM 1 FP | | 454 |
| 6 | 75667 | QOM 100 | X-REFERS TO 00403 | XXXXXX |
| 7 | 82259 | QOM100 CP | | UNAUTH |
| 8 | 00403 | QOM 100 VH | | 885 |
| 9 | 75669 | QOM 125 | X-REFERS TO 00404 | XXXXXX |
| 10 | 03461 | QOM125 | CP CIRCUIT BREAKER | UNAUTH |
| 11 | 00404 | QOM 125 VH | | 609 |
| 12 | 83832 | QOM150CP | CIRCUIT BREAKER | UNAUTH |
| 13 | 74795 | QOM 2 FP | | 765 |

DEPRESS ENTER TO CONTINUE
SELECT SCREEN OPTION: _ SELECT SEQ# (OPTIONAL): _
1=ORD INQ 2=PROD INQ 3=OPEN PO 4=PO/PROD 5=CAT ID 6=ORD ENT 7=RET 8=END

APPENDIX X

SQUARE D ORDER ENTRY
COPYRIGHT © 1988 SQUARE D COMPANY

P.O. NUMBER _____     SQUARE D ORDER NUMBER _____
                                          DATED: _____

SHIPPING
ADDRESS.     _____
             _____
             _____

CITY _____ ST ____ ZIP ____

MARKING 1. _____  2. _____
ROUTING: STD ____ AIR ____ BUS ____ UPS 2ND DAY ____ SPL ____
COMPLETE SHIPMENT ____ NOT B/4 DATE ____
MD509#: 1. ____ 2. ____ 3. ____

| ORD QTY | PRODUCT CODE. | CATALOG/DESCRIPTION | STK | NEGO |
|---|---|---|---|---|
| ____ | ____ | ____ | ____ | ____ |
| ____ | ____ | ____ | ____ | ____ |
| ____ | ____ | ____ | ____ | ____ |
| ____ | ____ | ____ | ____ | ____ |
| ____ | ____ | ____ | ____ | ____ |

SELECT SCREEN OPTION: ____   SELECT SEQ# (OPTIONAL): ____
1=ORD INQ 2=PROD INQ 3=OPEN PO 4=PO/PROD 5=CAT ID 6=ORD ENT 7=RET 8=END

APPENDIX XI

SQUARE D RETURN AUTHORIZATION
COPYRIGHT © 1988 SQUARE D COMPANY

YOUR ACCOUNT NUMBER 9007____

REASON FOR RETURN (SELECT) ____     P.O. NUMBER _____
1. EXCESS STOCK                      INVOICE NUMBER ____ __ DATE ____
2. ORDERED IN ERROR                  DEBIT MEMO NUMBER _____
3. SHIPPED IN ERROR                  MEMO MESSAGE _____

| QTY | PRODUCT CODE | QTY | PRODUCT CODE | QTY | PRODUCT CODE |
|---|---|---|---|---|---|

APPENDIX XI-continued

```
SELECT SCREEN OPTION: ___
1=ORD INQ  2=PROD INQ  3=OPEN PO  4=PO/PROD  5=CAT ID  6=ORD ENT  7=RET  8=END
```

We claim:

1. A method of operating a computer system for ordering products requested by customers from terminals at customer locations, said computer system having a memory storing information defining respective products, said information including catalog numbers, said catalog numbers being used in a catalog distributed by said supplier to said customers to identify said products, said method comprising the steps of:
   (a) receiving from one of said terminals a number specified by a respective customer, said number being different from said catalog numbers in said catalog number index;
   (b) searching said memory to find information about a plurality of said products including catalog numbers that only partially match the number specified by said respective customer;
   (c) transmitting to said one of said terminals said information about said plurality of products that was found in step (b);
   (d) receiving from said one of said terminals an order by said respective customer for one of said products selected by said respective customer in response to said step (c) of transmitting said information about said plurality of products; and
   (e) processing said order at an order processing location.

2. The method as claimed in claim 1, wherein said information transmitted to said one of said terminals includes a list of product codes that uniquely identify said plurality of products.

3. The method as claimed in claim 1, wherein said information transmitted to said one of said terminals includes a list of numbers indicating the respective availability of said plurality of products.

4. The method as claimed in claim 1, further comprising the step of receiving from said one of said terminals a selection of one of said plurality of products by said respective customer.

5. The method as claimed in claim 4, wherein said one of said terminals displays to said respective customer said information about said plurality of products in a sequence.

6. The method as claimed in claim 4, further comprising the step of passing product information for the selected one of the plurality of products to a line item of an order for that product.

7. A computer system for enabling customers to enter orders for products, said computer system including display terminals at customer locations; a memory for holding information defining respective products, said information including catalog numbers used in a catalog distributed by said supplier to said customers to identify said products; means for displaying at said display terminals a series of screens for enabling said customers to order selected ones of said products by specifying catalog numbers; means for receiving from said display terminals numbers specified by said customers, said numbers specified by said customers being different from said catalog numbers held in said memory; means for searching said memory to find information about a plurality of said products including catalog numbers that only partially match each of the numbers specified by the customers; and means for transmitting back to the respective display terminals the information about said plurality of products that was found in said memory in response to each of the numbers specified by the respective customers.

8. The computer system as claimed in claim 7, wherein said means for transmitting includes means for transmitting a list of product codes that uniquely identify said plurality of products that was found in said memory in response to each of the numbers specified by the respective customers.

9. The computer system as claimed in claim 7, wherein said means for transmitting includes means for transmitting a list of numbers indicating the respective availability- of each of said plurality of products that was found in said memory in response to each of the numbers specified by the respective customers.

10. The computer system as claimed in claim 7, further comprising means for receiving from each of said data terminals a selection by the respective customer of one of said plurality of products that was found in said memory in response to each of the numbers specified by the respective customer.

11. The computer system as claimed in claim 7, further comprising means for displaying to said customers said information about said plurality of products in a sequence.

12. A method of operating a computer system for ordering products requested by customers from display terminals at customer locations, said computer system having a memory storing a product file including records of information defining respective products offered by a supplier, and a catalog number index of catalog numbers used in a catalog distributed by said supplier to said customers to identify at least some of said products, the catalog numbers in said catalog number index being associated with respective records in said product file, said method comprising the steps of:
   (a) receiving from one of said terminals a number specified by a respective customer, said number being different from said catalog numbers in said catalog number index;
   (b) searching said catalog number index for a catalog number that only partially matches the number specified by the customer;
   (c) reading from said product file the record associated with the catalog number that only partially matches the number specified by the customer;
   (d) reading from said product file other records of information about products that are similar to the product defined by the information of said record associated with said catalog number that only partially matches the number specified by the customer; and
   (e) transmitting to said one of said terminals information from said records read from said product file for display to said respective customer, wherein said product file is a key-indexed file using the catalog number as a primary key, said catalog index is searched by a random access of said product file using the number specified by said respective customer as a key, and said product file is read for said other records of information by a sequential access of said product file.

13. The method as claimed in claim 12, wherein said information transmitted to said respective customer includes a list of product codes that uniquely identify the products defined by said information from said records.

14. The method as claimed in claim 12, wherein said information transmitted to said respective customer includes a list of numbers indicating the availability of the respective products defined by said information from said records.

15. The method as claimed in claim 12, further comprising the step of receiving from said respective customer a selection of one of said products defined by the information of said records read from said product file, and displaying to said respective customer information about the selected one of said products, said information about the selected one of said products being obtained from said information of said records read from said product file.

16. The method as claimed in claim 12, wherein said records are arranged sequentially in said product file, and information from said records is displayed in a corresponding sequence to said respective customer.

17. The method as claimed in claim 16, further comprising the step of receiving from said respective customer a sequence number for selecting one of said products defined by the information of said records read from said product file.

18. The method as claimed in claim 12, further comprising the steps of passing said information from said records read from said product file through a product file buffer, and transmitting pages of information from said product file buffer to said one of said display terminals in response to "page up" and "page down" commands received from said one of said display terminals.

19. The method as claimed in claim 18, wherein said computer system executes a multiplicity of customer processes to communicate with a multiplicity of customers simultaneously, and each customer process uses a different respective product file buffer.

* * * * *